Dec. 5, 1933.  F. JOHNSON  1,937,965
TRANSMISSION
Filed March 16, 1931
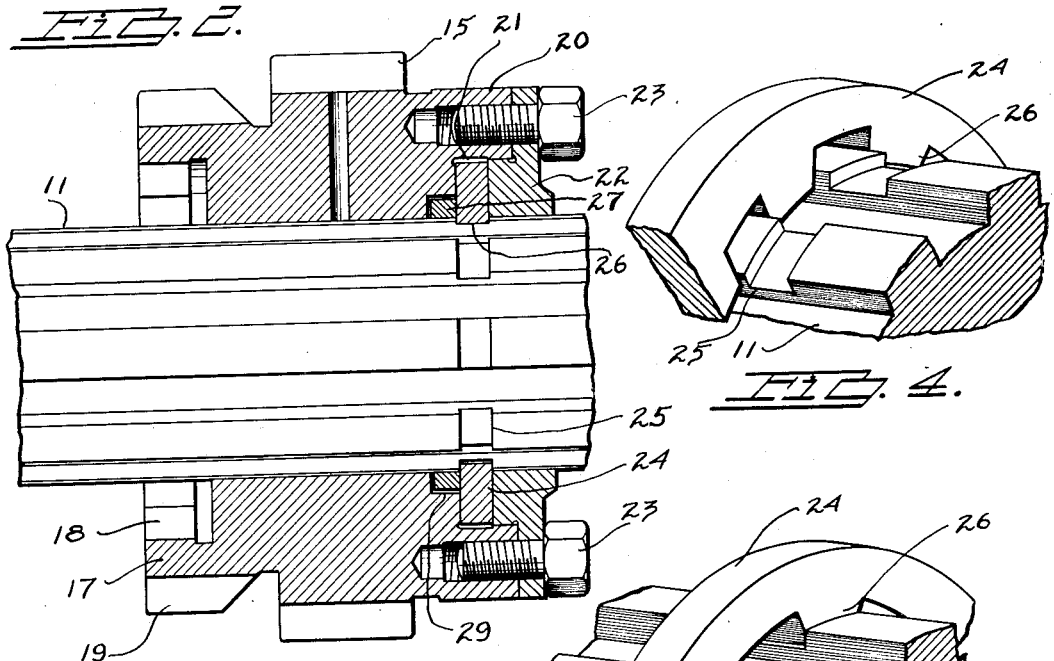
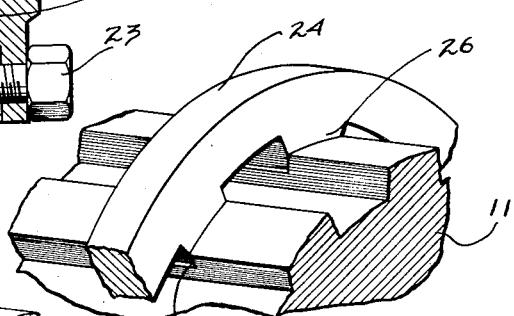
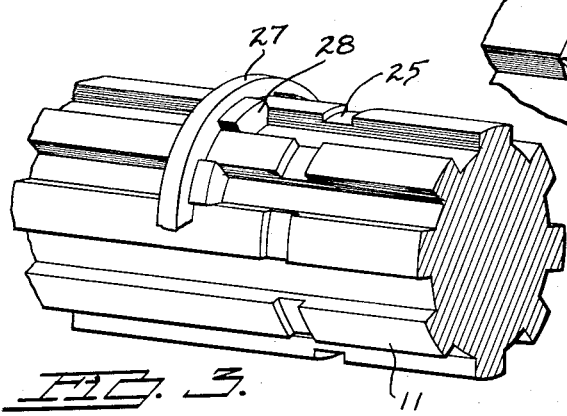
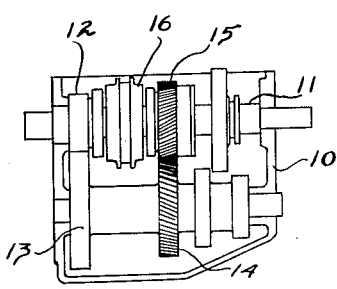
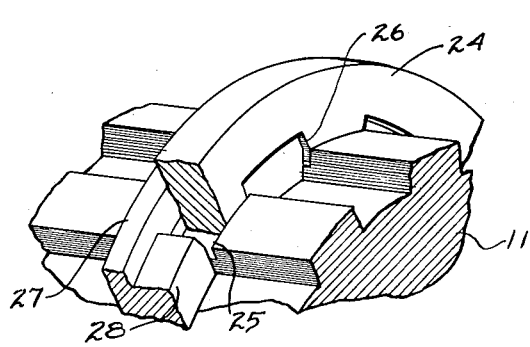
INVENTOR.
Frank Johnson.
BY
ATTORNEY.

Patented Dec. 5, 1933

1,937,965

UNITED STATES PATENT OFFICE 1,937,965

TRANSMISSION

Frank Johnson, Detroit, Mich., assignor to Ford Motor Company, Dearborn, Mich, a corporation of Delaware Application March 16, 1931. Serial No. 522,877

6 Claims. (Cl. 308—135)

The object of my invention is to provide a transmission having a novel gear retaining device therein, the purpose of which is for rotatably mounting a transmission gear on the transmission splined shaft to be thereby held against longitudinal movement in both directions. The use of helical gears in the construction of transmissions is gaining in favor because of their quiet operation and long life. However, it is obvious that such helical gears cannot be shifted axially to selectively obtain the various speeds of the transmission so that they can be used successfully only in constant-mesh transmissions, that is, transmissions in which the driving gears are always in mesh and a series of jaw clutches are selectively engaged to connect the various gears with the driving shaft. In such transmissions, it is general practice to rotatably mount one or more helical gears on the driven splined shaft of the transmission and to provide a shiftable clutch splined to the shaft which may be reciprocated into engagement with suitable clutch teeth formed on the gear member, thus clutching the gear member to the spline shaft to obtain that particular transmission speed ratio. Adequate means must be provided for preventing axial movement of these helical gears which are rotatably mounted on the splined shaft because the end thrust produced by the helical teeth would otherwise force the gears out of mesh, and because the movement of the clutch member is fixed and consequently the gear must be held in a fixed axial position in order to cooperate with this clutch. It is the purpose of this invention to disclose a novel device whereby such a rotatable gear may be quickly and securely anchored against axial movement on a splined shaft.

Still a further object of my invention is to provide an anchoring device which will provide a maximum over-all bearing length for the transmission gear to thereby prevent wabble of the gear on the spline shaft. The end thrust produced by helical gear teeth is concentrated at the point of mesh on one side of the gear and is resisted only by the thrust shoulder or washer on the shaft. Thus, this thrust pressure tends to bend the gear on the shaft or produce a wabble in the gear which can only be resisted by providing an adequate length for the gear bearing, as the intermediate portion of the bearing has no effect in counteracting this wabble motion. Inasmuch as lengthwise space is very limited in transmissions, I have provided a transmission gear which straddles my improved retaining device to thus secure a transmission gear bearing on each side thereof so that no additional length is required in the transmission on account of my retaining device.

With these and other objects in view, my invention consists in the arrangement, construction, and combination of the various parts of my improved device, as described in this specification, claimed in my claims, and illustrated in the accompanying drawing, in which:

Figure 1 shows a diagrammatic view of a transmission having my improved thrust retaining device incorporated therein.

Figure 2 shows a vertical central sectional view through the intermediate rotatable gear of the transmission shown in Figure 1.

Figure 3 is a perspective view of a portion of the main transmission shaft, illustrating the construction of my improved splined retaining ring.

Figure 4 is an enlarged fragmentary perspective view of my thrust washer, showing the means whereby it is moved axially into position on the splined shaft.

Figure 5 is a perspective view of the parts, shown in Figure 4, illustrating the method whereby the thrust collar is rotated through the thickness of one splined tooth when aligned with the thrust retaining groove in the splined shaft, and Figure 6 is an enlarged fragmentary perspective view of the thrust collar and splined shaft in the position shown by Figure 5, my retaining ring having been coupled therewith to prevent the rotation of the thrust collar to thereby fixedly secure the thrust collar on the splined shaft.

Referring to the accompanying drawing, I have used the reference numeral 10 to indicate generally a transmission case commonly associated with an automobile engine. A splined shaft 11 is rotatably mounted in the transmission case 10 in line with an engine operated gear 12 which is in constant mesh with a cluster gear 13, the latter being rotatably mounted in the transmission case in position spaced from the axis of the shaft 11. The cluster gear 13 is composed of a plurality of integral gears of various sizes, the second speed gear 14 of which is in constant mesh with an intermediate speed gear 15 which is rotatably mounted on the splined shaft 11. It will be noted from the drawing that the gears 12, 13, 14 and 15 are all helical gears so that quiet operation of the transmission is assured. However, the gear 15 being rotatably mounted on the splined shaft 11 must be provided with adequate means whereby the axial thrust of the gear teeth can be compensated for.

I have provided a shiftable clutch 16 which is splined to the transmission shaft 11 between the gears 12 and 15 so as to reciprocate thereon into clutching engagement with either the direct driven gear 12 or the intermediate speed gear 15 to thereby selectively provide the high and intermediate speeds of the transmission. The clutch mechanism 16 in this instance comprises an overrunning clutch to obtain what is termed free-wheeling for these speed ratios of the transmission. Although such free-wheeling is desirable, it is not essential that an overrunning clutch be provided, as it in no way cooperates with my improved retaining device but simply illustrates one installation wherein this device is particularly suitable for use.

Referring to Figure 2, the splined shaft 11 is composed of eight equally spaced longitudinally extending spline teeth, the outer periphery of which are ground to a true circumference so as to rotatably mount the gear 15 thereon. This gear is provided with an extension 17 projecting from one side thereof into which a plurality of internal clutch teeth 18 and external clutch teeth 19 are machined, which clutch teeth engage with the teeth of the clutch member 16 to operatively connect the gear 15 to the splined shaft. Extending from the opposite side of the gear 15, I have provided an integral ring 20 having an annular bore 21 therein which receives my improved thrust collar. An annular cover 22 is secured to the outer end of the ring 20 by a plurality of bolts 23 so as to enclose the thrust collar, the bore of the cover 22 being accurately fitted on the splined shaft, thereby forming a continuation of the gear bearing.

My improved thrust collar, which is the subject of this invention, consists of an annular washer-like ring 24 which is adapted to be retained in an annular groove 25 which is machined in and extends around the splined teeth to a depth of about one-half the depth of these splined teeth. This groove is, therefore, only an annulus of notches in the splined teeth. The thrust collar 24 is bored out to the same diameter as the bottom of the groove 25 and a plurality of notches, corresponding to the number of splined teeth in the shaft, are machined in the bore of the collar 24 to a depth so that the bottom of these notches form a circle considerably larger than the outside diameter of the splined shaft from which circle a plurality of teeth 26 project inwardly. It will thus be seen that the collar 24 may be readily pushed axially along the shaft until it is aligned with the groove 25 and then rotated through the thickness of one splined tooth whereby the teeth 26 will be aligned with the splined teeth in the shaft and the thrust collar prevented from axial movement by the groove 25. I have provided a retaining member whereby rotary movement of the thrust collar from this engaged position is prevented so that the collar cannot be accidentally rotated and thereby disengaged from the groove 25.

A retaining ring 27 consisting of a splined ring member of somewhat smaller diameter than the ring 24 is formed with a plurality of teeth 28 projecting from one side thereof, these teeth lying in the splined shaft grooves and projecting somewhat above these splines. It will readily be seen that when the collar 24 is in the position shown in Figure 5, the retaining ring 27 may then be moved axially so that the teeth 28 may enter the splined grooves in the plane of the collar to thereby prevent rotary movement thereof. Thus, as long as the retaining ring 27 is held in this axial position, it is impossible to disengage the thrust collar from the shaft. When, however, it is desired to remove the device from the shaft, the retaining ring 27 is first moved axially away from the collar 24 at least the thickness of the teeth 28, then the collar is rotated through the thickness of one spline tooth and then both ring and collar are removed axially from the shaft.

Means are shown whereby the retaining ring and thrust collar when once assembled and secured to the gear 15 are thereafter prevented from axial displacement with each other so that the device is positively fixed to the shaft. It will be noted that the ring 20 of the gear 15 is provided with a bore 21 into which the thrust collar 24 is inserted, the bottom of the bore and the cover 22 engaging the respective sides of the thrust collar to thereby fixedly retain the gear member against axial displacement on the shaft. In order that clearance may be provided for the retaining ring 27, the bottom of the bore 21 is provided with annular recess 29 therein into which this ring is free to rotate. Thus, when the cover member 22 is secured in place the gear 13 is rotatably mounted on the splined shaft, while at the same time is prevented from axial displacement by the thrust collar 24.

Among the many advantages arising from the use of my improved device, it may be well to mention that I have provided a thrust collar which may be readily attached to the intermediate portion of a transmission shaft, the thrust retaining properties of which do not depend upon screws, bolts, or other elements which may be loosened while in operation.

Still further, my improved thrust ring is so constructed that it may readily be secured to the transmission shaft while it is in position in the transmission case so that assembly of the gears therein is greatly facilitated.

Still a further advantage of my improved device is that it is housed within the intermediate portion of the gear, thereby allowing the effective ends of the gear to be utilized as a bearing surface to more effectively prevent wabble of the gear.

Some changes may be made in the arrangement, construction, and combination of the various parts of my improved device, without departing from the spirit of my invention, and it is my intention to cover by my claims such changes as may reasonably be included within the scope thereof.

I claim as my invention:

1. In a transmission, a splined shaft having an annular groove machined in said splines, a thrust collar having a bore substantially fitting said groove, said bore being notched to form internal splined teeth to thereby permit assembly of the collar in the groove, and a retaining ring mounted on and secured against axial movement on said shaft having teeth projecting from one side thereof adapted to enter between the splines of said shaft on the thrust collar teeth when said teeth and splines are aligned.

2. In a transmission, a splined shaft having an annular groove machined in the periphery of said splines, an internally splined thrust collar adapted to rotate in said groove, said internal splines permitting assembly of the collar over the splined teeth on the shaft, and a retaining member mounted on and secured against axial movement on said shaft having teeth projecting from one side thereof adapted to enter between the splines of said shaft and the thrust collar splines when said splines are aligned, whereby rotation of said collar on the shaft is prevented to thereby retain the thrust collar splines in said groove and prevent axial movement thereof.

3. In a transmission, a splined shaft having an annular groove machined in said splines to a depth a fraction of the depth of said splines, an internally splined thrust collar adapted to rotate in said groove, and a retaining ring detachably secured on said shaft having teeth projecting from one side thereof adapted to enter between the splines of the shaft and the splines of the thrust collar, whereby rotation of said collar in the groove is prevented to thereby prevent axial movement of the collar.

4. In a transmission, the combination of a splined shaft having an annular groove machined in said splines, an internally splined thrust collar adapted to rotate in said groove, a retaining member detachably secured on said shaft having teeth projecting from one side thereof adapted to enter between the splines of said shaft and thrust collar to thereby prevent axial movement of the collar, a transmission gear rotatably mounted on said shaft having an annular bore therein adapted to receive said retaining ring and thrust collar, and a cover member secured over said bore preventing relative movement between said retaining ring and thrust collar.

5. The combination as claimed in claim 4, said cover member having a bearing surface of appreciable length whereby it is rotatably mounted on the splined shaft.

6. The combination as claimed in claim 4, said cover member being axially aligned in said annular bore and having a bearing surface of appreciable length whereby it is rotatably mounted on the splined shaft.

FRANK JOHNSON.